United States Patent [19]  [11]  4,049,252
Bell  [45]  Sept. 20, 1977

[54] INDEX TABLE

[76] Inventor: Theodore F. Bell, c/o Norbell Corp., 400 Fentress Blvd., Daytona Beach, Fla. 32014

[21] Appl. No.: 655,203

[22] Filed: Feb. 4, 1976

[51] Int. Cl.² .............................................. B23Q 1/04
[52] U.S. Cl. .......................................... 269/57; 269/70
[58] Field of Search ............................ 269/66, 69, 70; 51/216 ND; 74/813 C, 820

[56] References Cited
U.S. PATENT DOCUMENTS

| 2,656,655 | 10/1953 | Draeg | 51/216 ND |
| 2,832,242 | 4/1958 | Van Vooren | 269/70 |
| 2,842,986 | 7/1958 | Rodal | 269/69 |
| 2,848,853 | 8/1958 | Wittkopp | 269/70 |

Primary Examiner—Al Lawrence Smith
Assistant Examiner—Robert C. Watson
Attorney, Agent, or Firm—Barnes, Kisselle, Raisch & Choate

[57] ABSTRACT

An index table comprising a base, a table mounted about an axis for rotation on the base and means for indexing said table to bring successive stations of the table into predetermined positions. Spaced locating plates are fixed on said table at circumferentially spaced points and radially movable locking pins are provided on the base and are movable radially inwardly to engage the locating plates and lock the table relative to said base and are movable radially outwardly to disengage the table from the base. Upon rotation of the table to move the radial locking pins radially outwardly, a pump is operated to pump oil to various portions of the table.

11 Claims, 7 Drawing Figures

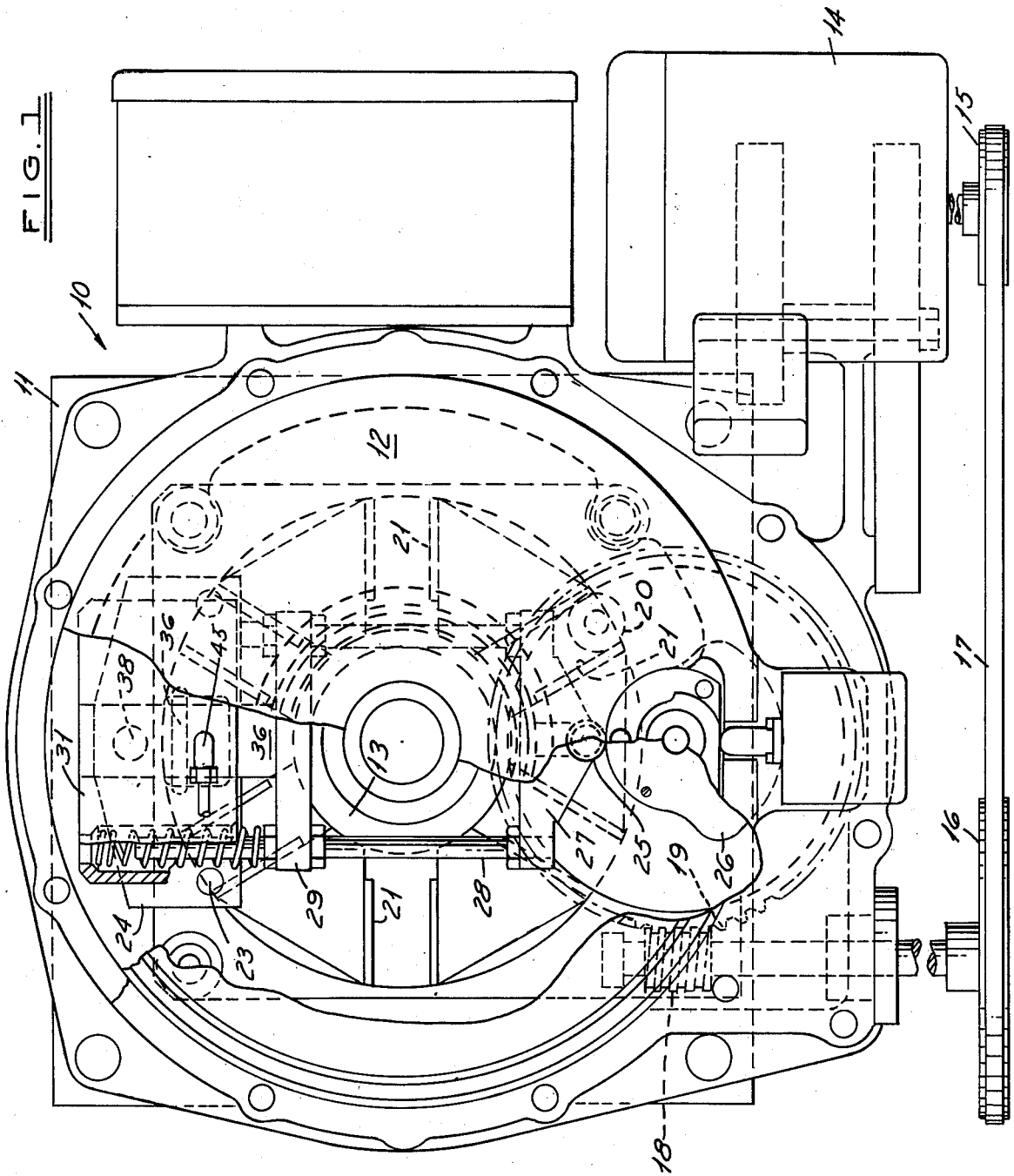

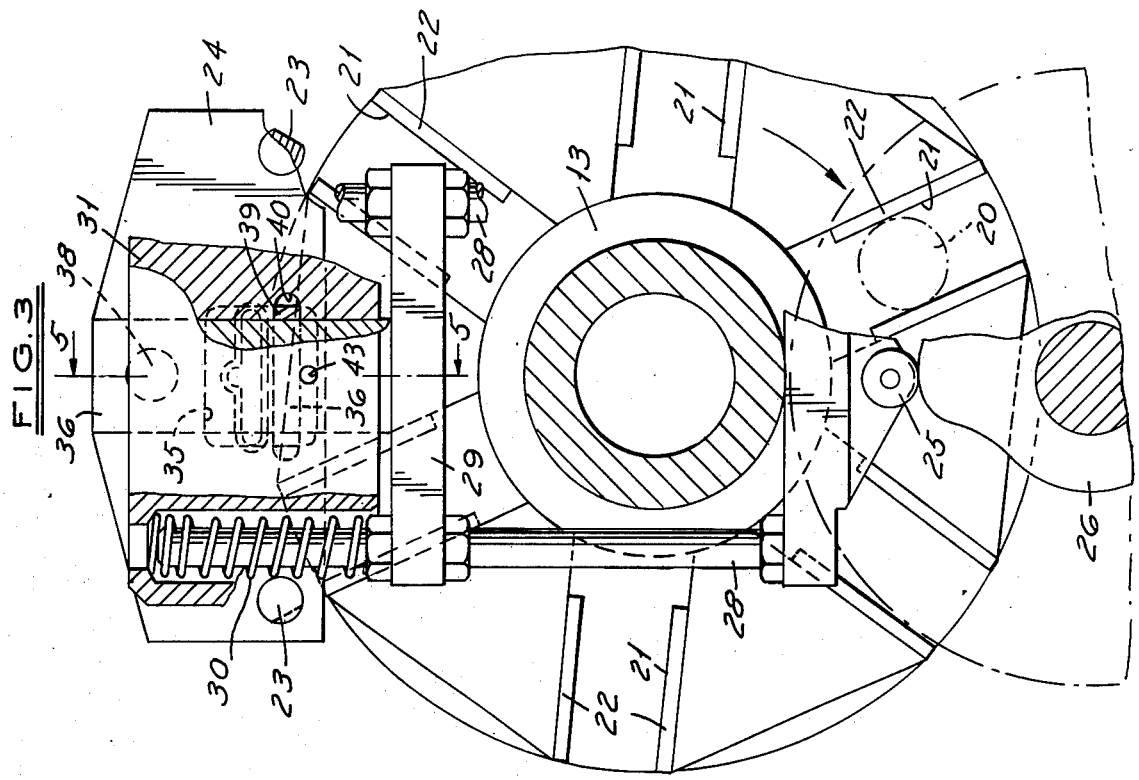
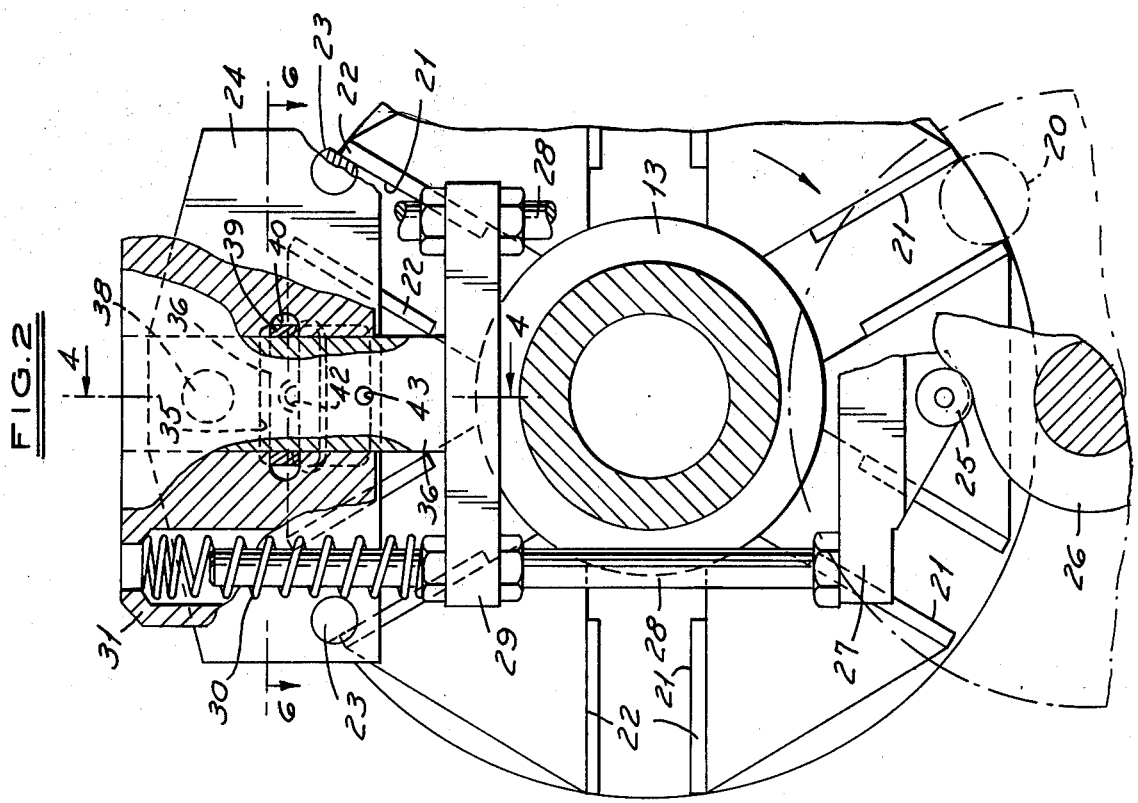

4,049,252

INDEX TABLE

This invention relates to index tables.

BACKGROUND OF THE INVENTION

In the production of various articles, it is common to provide an index table for moving the parts through successive stations at which various operations are performed. Where the operations are automated, it is desirable that the indexing should be accurate and repetitive so that the parts are moved an accurate angular distance.

Among the objects of the invention are to provide an index table which is indexable by predetermined increments and is accurately positioned at each station; which index table has the parts submerged in oil and at least has certain parts thereof such as main bearings thereof lubricated by mechanical motion of the index table.

SUMMARY OF THE INVENTION

In accordance with the invention, the index table comprises a base, a table mounted about an axis for rotation on the base, and means for indexing the table to bring successive points of the table into predetermined positions. Spaced locating means are fixed on the table at circumferentially spaced points and radial locking means on the base are movable radially outwardly to disengage the table from the base. Upon rotation of the table to move the radial locking means radially outwardly, means are operable to lubricate portions of the table.

DESCRIPTION OF THE DRAWINGS

FIG. 1 is a part sectional plan view of an index table embodying the invention.

FIG. 2 is a fragmentary view of a portion of the table shown in FIG. 1.

FIG. 3 is a view similar to FIG. 2 showing the parts in a different operative position.

DESCRIPTION

Figure 4:
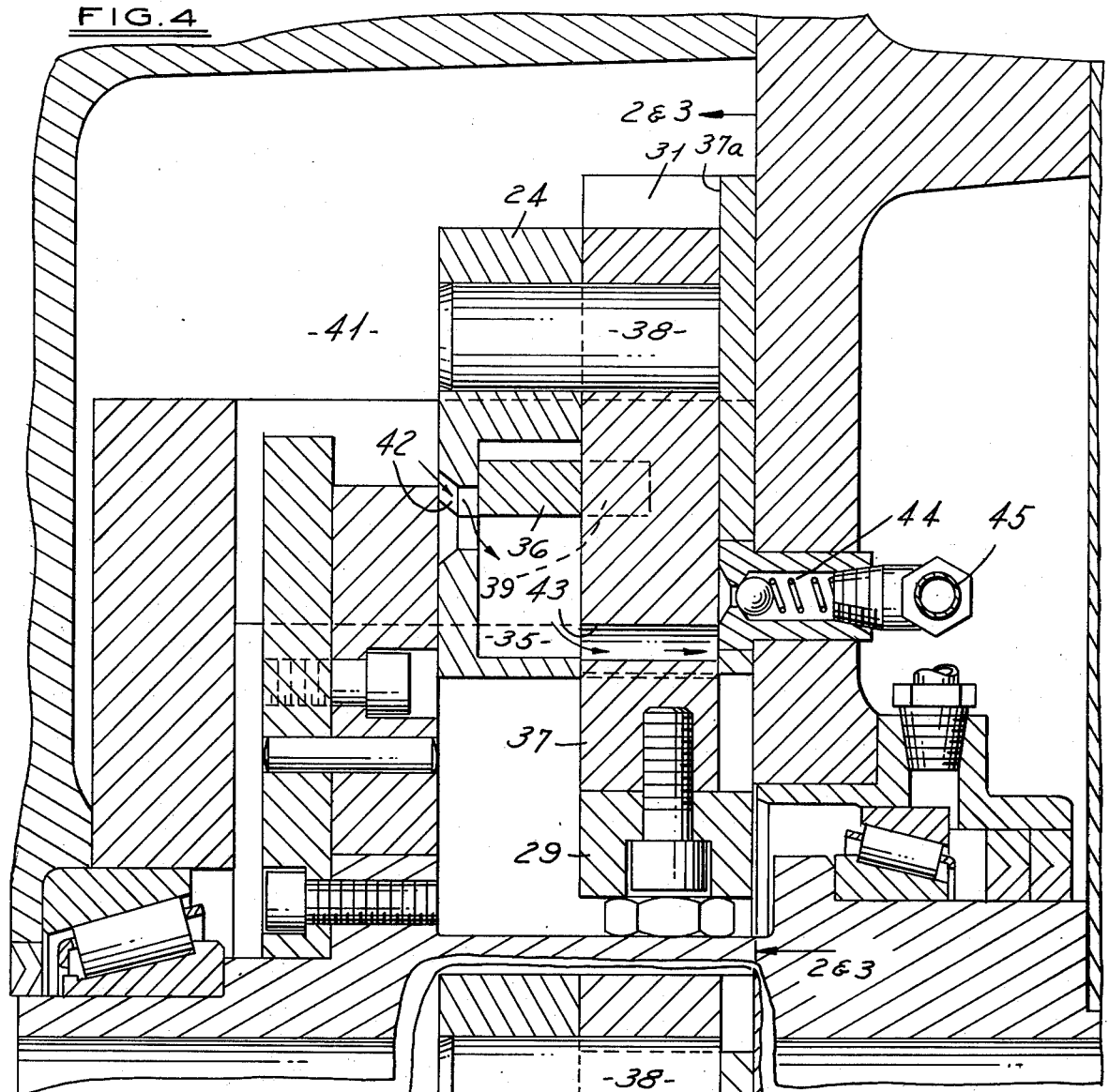
FIG. 4 is a sectional view on an enlarged scale taken along the line 4—4 in FIG. 2.

Referring to FIG. 1, the table 10 embodying the invention comprises a base 11 on which the table 12 is rotatably mounted about an axis by main bearings 13. Drive to index the table and bring stations on the table to a work point is achieved by a motor and gear box 14 that drives a worm 18 through pulleys 15, 16 and a belt 17. The worm 18 in turn rotates a gear 19 on the base which in turn moves a cam follower 20 on the same shaft as gear 19 into and out of engagement with slots 21 formed by hardened plates 22 at circumferentially spaced points on the table to provide a Geneva drive, in accordance with conventional construction.

In accordance with the invention, the table is locked at each station by utilizing the plates 22 as locating means and engaging the plates with locking pins 23 that are provided on a locking yoke 24. The locking pins 23 are accurately spaced circumferentially in locking yoke 24. The locking yoke 24 is movable radially outwardly, against the action of springs, by engagement of a cam follower 25 on the shaft of gear 19 with a cam 26. The cam follower 25 is on a cross member 27 that is connected by tie bars 28 to a tie bar 29 and is yieldingly urged radially inwardly by springs 30 extending between a fixed member 31 on the base and the tie bar 29 (FIG. 2).

As the table is indexed by moving of the Geneva drive, the cam follower 25 following the cam 26 moves the locking yoke 24 outwardly and in turn moves the locking pins 23 out of engagement with the circumferentially outermost plates 22 at the particular position to unlock the table (FIG. 3). Continued rotation of the Geneva movement indexes the table and then permits the cam 26 to control the movement of the pins 23 radially inwardly at the next station.

Figure 7:
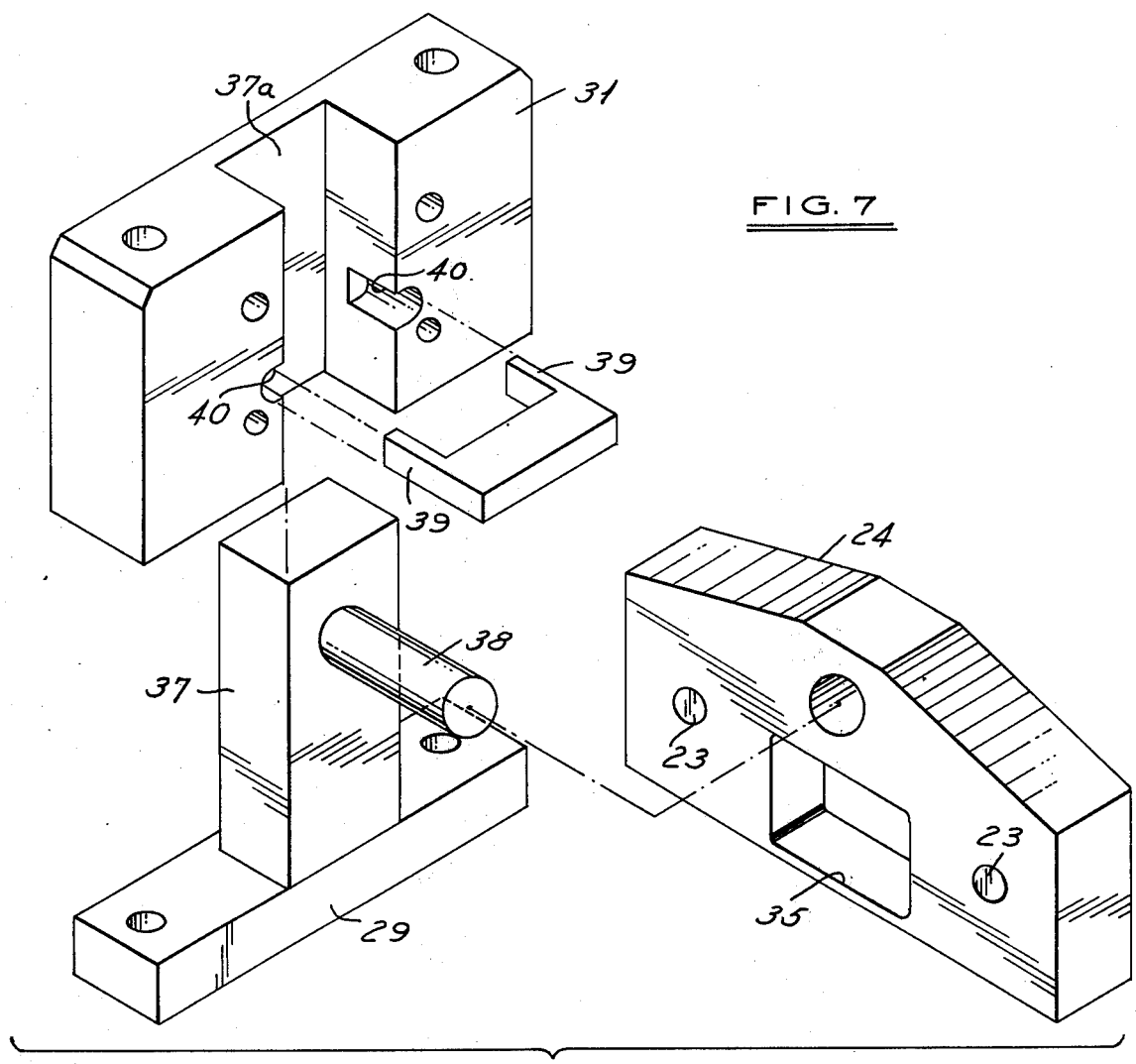
FIG. 7 is an exploded view of parts of the table.
Figure 6:
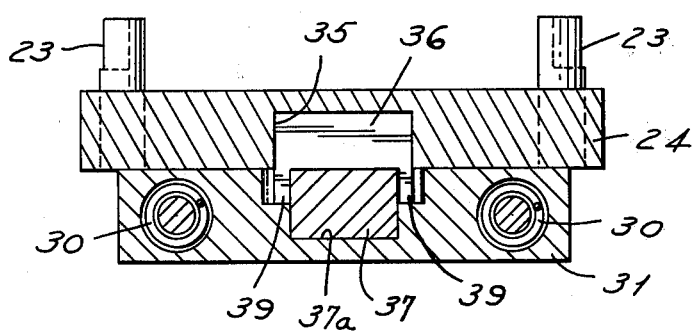
FIG. 6 is a fragmentary sectional view taken along the line 6—6 in FIG. 2.

In order to provide lubrication to the main bearings a chamber 36 is provided on the locking yoke and a piston 36 is fixed on the base. As the yoke 24 reciprocates outwardly, chamber 35 is also moved so that oil is pumped from the chamber 35. Specifically, tie bar 29 includes an extension that forms a slide 37 which slides in a slideway 37a in stationary part 31 (FIG. 7). The chamber 35 is formed in the locking yoke 24 which supports locking pins 23. The locking yoke 24 is connected to the slide 37 by a pin 38 that extends into openings in the yoke 24 and slide 37. The piston 36 comprises a flat vane and is locked to stationary part 31 by portions 39 that extend into grooves 40 in the part 31.

Figure 5:
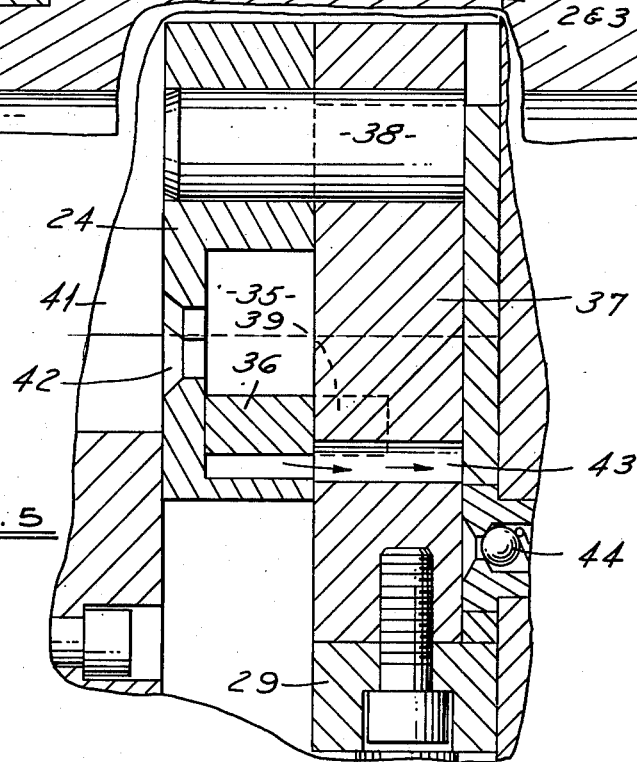
FIG. 5 is a sectional view on an enlarged scale taken along the line 5—5 in FIG. 3.

As shown in FIG. 4, when the pins 23 are in position holding the table at any of the indexed positions, oil can flow freely from the area 41 surrounding the various parts in base 11. The oil flows through an opening 42 into chamber 35. At this time, piston 36 is at the radially outermost position relative to chamber 35. As the table is indexed, cam 26 moves yoke 24 radially outwardly so that the piston 36 compresses the oil in chamber 35. As the yoke 24 continues to move radially outwardly, oil flows from chamber 35 through an opening 43 in stationary part 31 and a check valve 44 to a line 45 that in turn directs oil to the upper parts of the main bearing 13 and the bearing of the shaft that supports gear 19 and cam 26. As the yoke continues its movement radially outwardly, the opening 43 moves past the check valve 44, interrupting the flow of oil thereto (FIG. 5).

After the table has been indexed and the yoke 24 is moved radially inwardly, the piston 36 first forces oil on the upper side thereof, as viewed in FIG. 5, outwardly through opening 42 until it reaches the position shown in FIG. 4 wherein the oil can flow back below piston 36 for the next cycle. The last portion of the movement of yoke 24 entraps oil above piston 36, as viewed in FIG. 4, cushioning the stroke and avoiding hard hammering of contact pins 23 on plates 22.

Piston 36 assists in guiding and minimizing lateral play of the locking yoke 24 thereby insuring positive alignment of the pins 23 and slots 21 and thus accurate positioning of the table at each station.

It can thus be seen that the additional lubrication is achieved by the same motion that produces the unlocking of the table.

As shown in FIG. 2, as the cam roller 20 leaves a slot 21 after indexing, the pins 23 have engaged plates 22 and are held against plates 22 by the force of springs 30. In this position, a line perpendicular to each pin 23 intersects at the center of pin 38 which is at a point radially inwardly of the point of intersection of lines perpendicular to the ends of the plates 22 which are contacted by pins 23.

It can thus be seen that the index table embodying the invention provides accurate, repetitive indexing, positive locking and lubrication of the parts which are normally difficult to lubricate.

I claim:

1. In an index table, the combination comprising
a base,
a table mounted about an axis for rotation on the base,
means for indexing said table to bring successive points of said table into predetermined positions,
spaced locating means fixed on said table at circumferentially spaced points,
radial locking means on said base movable radially inwardly to engage said locating means and to lock said table relative to said base and movable radially outwardly to disengage said table from said base,
and means operable upon rotation of said table to move said radial locking means radially inwardly and outwardly,
pump means operable upon radial movement of said radial locking means to provide oil under pressure for lubricating portions of said table.

2. The combination set forth in claim 1 wherein said pump means comprises a cavity movable radially with said radial locking means and a piston fixed to said base.

3. In an index table, the combination comprising
a base,
a table mounted about an axis for rotation on said base,
means for indexing said table to bring successive points of said table into predetermined positions,
lubricating means for lubricating portions of said table and means operable upon rotation of said table to actuate said lubricating means to provide oil under pressure for lubricating portions of said table,
spaced locating means fixed on said table at circumferentially spaced points,
radial locking means on said base movable radially inwardly to engage said locating means and lock said table relative to said base and outwardly to disengage said table from said base,
said means operable upon rotation of said table being also operable to move said radial locking means radially inwardly and outwardly,
said locating means comprising circumferentially spaced inclined surfaces,
said radial locking means including spaced members operable to engage said inclined surfaces,
said spaced members having complementary surfaces,
said means for rotating said table including a Geneva type movement,
said lubricating means comprising a cavity in one of said base and said radially movable locking means and a piston in the other of said base and said radially movable locking means.

4. The combination set forth in claim 3 wherein said cavity is on said locking means and said pistons on said base.

5. In an index table, the combination comprising
a base,
a table mounted about an axis for rotation on said base,
means for indexing said table to bring successive points of said table into predetermined positions,
lubricating means for lubricating portions of said table and means operable upon rotation of said table to actuate said lubricating means to provide oil under pressure for lubricating portions of said table,
said lubricating means comprising a slide movable radially inwardly and outwardly upon rotation of said table,
said slide having locking means thereon engageable with said table,
said slide having a chamber therein,
means for supplying oil to said chamber,
a vane mounted on said base and extending into said chamber,
means providing an outlet from said chamber.

6. The combination set forth in claim 5 wherein said slide functions to control the flow of oil from said means for supplying oil and said means providing an outlet.

7. The combination set forth in claim 6 wherein said means for indexing said table includes a plurality of pairs of angularly directed slots circumferentially spaced about said table,
a cam roller operable to engage said slots and index said table,
said locking means comprising spaced contact members on said slide engagable successively with each pair of said slots 8. The combination set forth in claim 7 wherein said contact members engage the circumferentially outermost surfaces of each pair of slots.

9. In an index table, the combination comprising
a base,
a table mounted about an axis for rotation on the base,
spaced locating members fixed on said table at circumferentially spaced points,
radial locking means on said base movable radially inwardly to engage said locating members and to lock said table relative to said base and movable radially outwardly to disengage said table from said base,
means engaging between adjacent spaced locating members for indexing said table to bring successive points of said table into predetermined positions,
and means operable upon rotation of said table to move said radial locking means radially inwardly and outwardly.

10. The combination set forth in claim 23 wherein said locating members comprise circumferentially spaced inclined surfaces.

11. In an index table, the combination comprising
a base,
a table mounted about an axis for rotation on said base,
means for indexing said table to bring successive points of said table into predetermined positions,
lubricating means for lubricating portions of said table,
locating means movable toward and away from said table to locate said table in any indexed position,
and means operable upon movement of said locating means to actuate said lubricating means to provide oil under pressure for lubricating portions of said table.

* * * * *

UNITED STATES PATENT OFFICE
CERTIFICATE OF CORRECTION

PATENT NO. : 4,049,252
DATED : September 20, 1977
INVENTOR(S) : Theodore F. Bell It is certified that error appears in the above-identified patent and that said Letters Patent are hereby corrected as shown below:

Column 4, line 48, cancel '23' and insert --9--

Signed and Sealed this

Twentieth Day of December 1977

[SEAL]

Attest:

RUTH C. MASON
Attesting Officer

LUTRELLE F. PARKER
Acting Commissioner of Patents and Trademarks